(12) United States Patent
Ho et al.

(10) Patent No.: US 7,040,911 B1
(45) Date of Patent: May 9, 2006

(54) TRANSCEIVER MODULE WITH CAM-BASED DELATCHING ACTUATOR

(76) Inventors: Samuel Ho, 4977 Roselle Common, Fremont, CA (US) 94536; Bradley S. Levin, 628 Forest Ave., Apt. C, Palo Alto, CA (US) 94301; Joseph John Vandenberg, 415 N. Lark Ellen Ave., West Covina, CA (US) 91791

( * ) Notice: Subject to any disclaimer, the term of this patent is extended or adjusted under 35 U.S.C. 154(b) by 224 days.

(21) Appl. No.: 10/383,301

(22) Filed: Mar. 7, 2003

Related U.S. Application Data (60) Provisional application No. 60/363,201, filed on Mar. 11, 2002.

(51) Int. Cl.
*H01R 13/62* (2006.01)

(52) U.S. Cl. ...................................... 439/352; 439/484
(58) Field of Classification Search ................ 439/352, 439/357, 358; 361/754, 728
See application file for complete search history.

(56) References Cited

U.S. PATENT DOCUMENTS

| | | | |
|---|---|---|---|
| 6,430,053 B1 * | 8/2002 | Peterson et al. ............ 361/728 |
| 6,434,015 B1 * | 8/2002 | Hwang ........................ 361/754 |
| 6,439,918 B1 * | 8/2002 | Togami et al. .............. 439/372 |
| 6,494,623 B1 * | 12/2002 | Ahrens et al. ................ 385/76 |
| 6,778,399 B1 * | 8/2004 | Medina et al. .............. 361/729 |
| 6,819,568 B1 * | 11/2004 | Cao ........................... 361/728 |
| 6,851,867 B1 * | 2/2005 | Pang et al. ................... 385/88 |
| 2004/0033027 A1 * | 2/2004 | Pang et al. ................... 385/53 |

* cited by examiner

*Primary Examiner*—Neil Abrams
(74) *Attorney, Agent, or Firm*—Parsons & Goltry; Robert A. Parsons; Michael W. Goltry (57) ABSTRACT

An optoelectric package comprising an elongated housing for fixedly holding an optoelectric module, and a cam-based delatching actuator mechanism fixedly attached to the elongated housing wherein the cam-based delatching actuator mechanism a mounting block fixedly attached to one of a first and a second horizontal side of the elongated housing, a lever arm fixedly attached to a first and a second vertical side of the elongated housing, and an actuator positioned adjacent to one of the first and second horizontal side of the elongated housing wherein the actuator is in mechanical communication with the lever arm.

6 Claims, 15 Drawing Sheets

TRANSCEIVER MODULE WITH CAM-BASED DELATCHING ACTUATOR

CROSS-REFERENCED TO RELATED APPLICATION

This application claims the benefit of U.S. Provisional Application Ser. No. 60/363,201, filed 11 Mar. 2002.

FIELD OF THE INVENTION

This invention relates to transceiver packages and more particularly to latching and delatching apparatus for the transceiver packages.

BACKGROUND OF THE INVENTION

At the present time, optical-to-electrical and electrical-to-optical (hereinafter "optoelectric") packages, containing a pair of optoelectric modules, are contained in one common or standard package. The modules are generally used in pairs for two-way communication. Multiple optoelectric packages are used in a common mounting rack to provide multiple communication channels. The optoelectric packages are positioned in the rack in, for example, rows and columns and, to save space the optoelectric packages are positioned as close together as possible.

Each optoelectric package is constructed to be inserted into an opening or cage in the rack. Once the optoelectric package is inserted completely into the cage, the optoelectric package is captured by means of a latch spring inside the cage that is positioned to engage a locking tab on the optoelectric package. To release the optoelectric package and remove it from the cage, the latch spring must be disengaged from the locking tab, after which the optoelectric package can be withdrawn from the cage.

The problems that arise result chiefly from the closeness, size and shape of the optoelectric packages. The optoelectric packages are generally oblong in shape with a multi-pin electrical plug or socket at the rear or inner end which mates with a multi-pin electrical socket or plug in the cage. The optoelectric package must nest snugly in the cage since any relative movement would eventually cause failures. However, because of the firm fit, withdrawal of the optoelectric package from the cage requires some effort. Because of the closeness of the multiple optoelectric packages in the rack, access to each optoelectric package is limited. Also, the latch spring must be disengaged from the locking tab as the optoelectric package is withdrawn.

In one prior art solution a simple linear actuator is provided. The linear actuator is pushed forward to raise the latch spring in the cage to release it from the locking tab. For this design, the linear actuator is entirely located under the optoelectric package and, therefore, is difficult to access. That is, one must push the linear actuator forward with one hand to raise the latch spring and then grip and pull the optoelectric package. This combined pushing and pulling action, along with the need to firmly grip whatever portion of the optoelectric package is available for gripping, is very inconvenient.

Another solution used in the prior art uses a locking tab on the end of a lever spring. This, solution requires a different rack and cage arrangement. Instead of moving the latch spring (as described above) in the cage, the locking tab is displaced to clear the latch and unlock the optoelectric package. Springs can be unreliable. For example, the spring can be bent or deformed by repeated use and will no longer effectively lock the optoelectric package into the cage.

BRIEF DESCRIPTION OF THE DRAWINGS

Referring to the drawings.

DETAILED DESCRIPTION OF THE DRAWINGS

Figure 1:
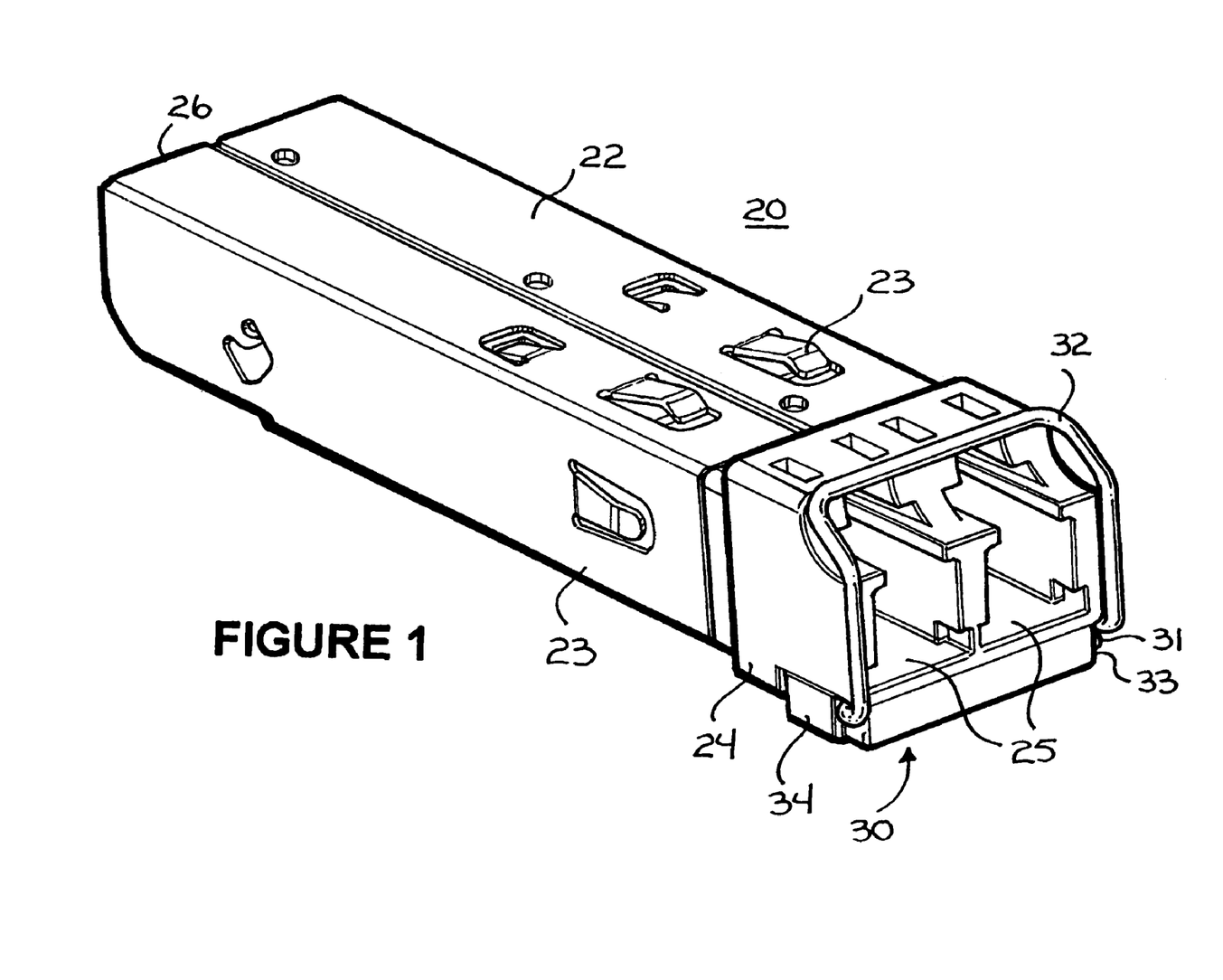
FIG. 1 is a front-top isometric view of an optoelectric package, in a locked orientation, in accordance with the present invention.
Figure 15:
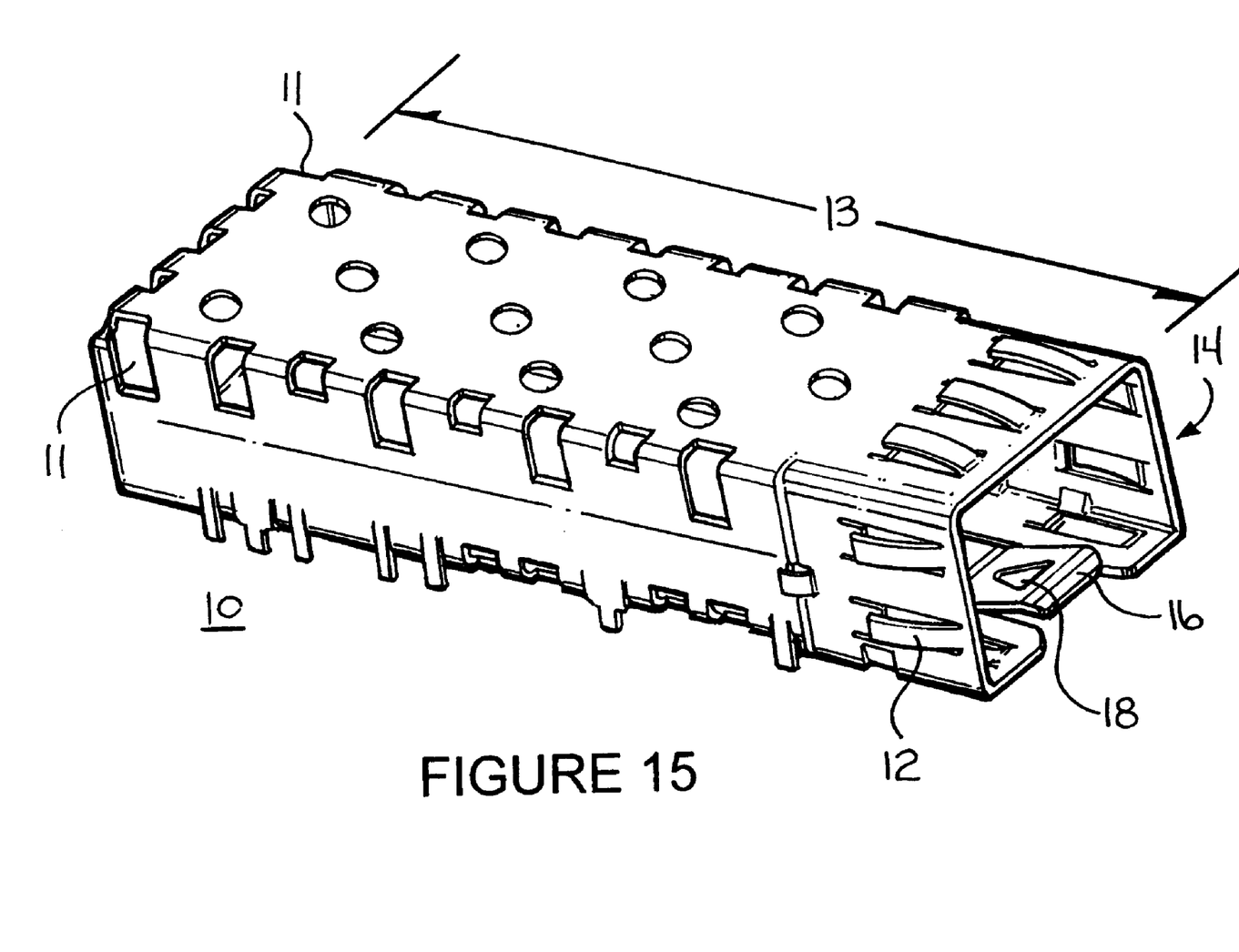
FIG. 15 is a front top isometric view of a standard cage designed to receive the optoelectric package of FIG. 1.

Turning now to FIG. 1, an optoelectric package 20 in accordance with the present invention is illustrated. Optoelectric package 20 includes an elongated housing 22, which in this embodiment is formed of metal and includes spring fingers 23 positioned to frictionally engage an inner surface of a cage 10 in a mounting rack (not shown). Optoelectric cage 10, illustrated in FIG. 15, is designed to hold optoelectric package 20 which slides into an opening 14. Cage 10 includes an inwardly biased latch spring 16 with a triangular opening 18 therein. It will be understood that cage 10 is typically included in an array of adjacent cages. However, we are illustrating one such cage for simplicity and ease of discussion. In the preferred embodiment, optoelectronic package 20 can be slid rearwardly within cage 10 a distance 13 as determined by tabs 11. Spring fingers 23 ensure a positive contact between optoelectric package 20 and cage 10 to prevent relative movement, once the optoelectric package is properly nested in cage 10 and to electrically connect optoelectric package 20 to cage 10.

Housing 22 includes a header 24, which in this embodiment is formed of a single piece and may be manufactured by some convenient means, such as molding or the like. Header 24 is mated with the elongated portions of housing 22 and includes a pair of openings 25 designed to receive an optical-to-electrical module (not shown) in one side and an electrical-to-optical module (not shown) in the other side. Optoelectric package 20 may have either the plug or socket of a multipin electrical connector at the rear end 26, which plug or socket is positioned to mate with a socket or plug in the mounting rack when the optoelectric package is properly nested in the cage of the mounting rack. In this embodiment, it is anticipated that each module includes a printed circuit board with multiple contacts formed on a rearwardly extending surface. Each of the modules may electrically connect to the multipin electrical connector at the rear end 26 of housing 22 when they are properly inserted into the openings 25 or, as in this embodiment, the combined modules may actually form the multipin connector.

Figure 2:
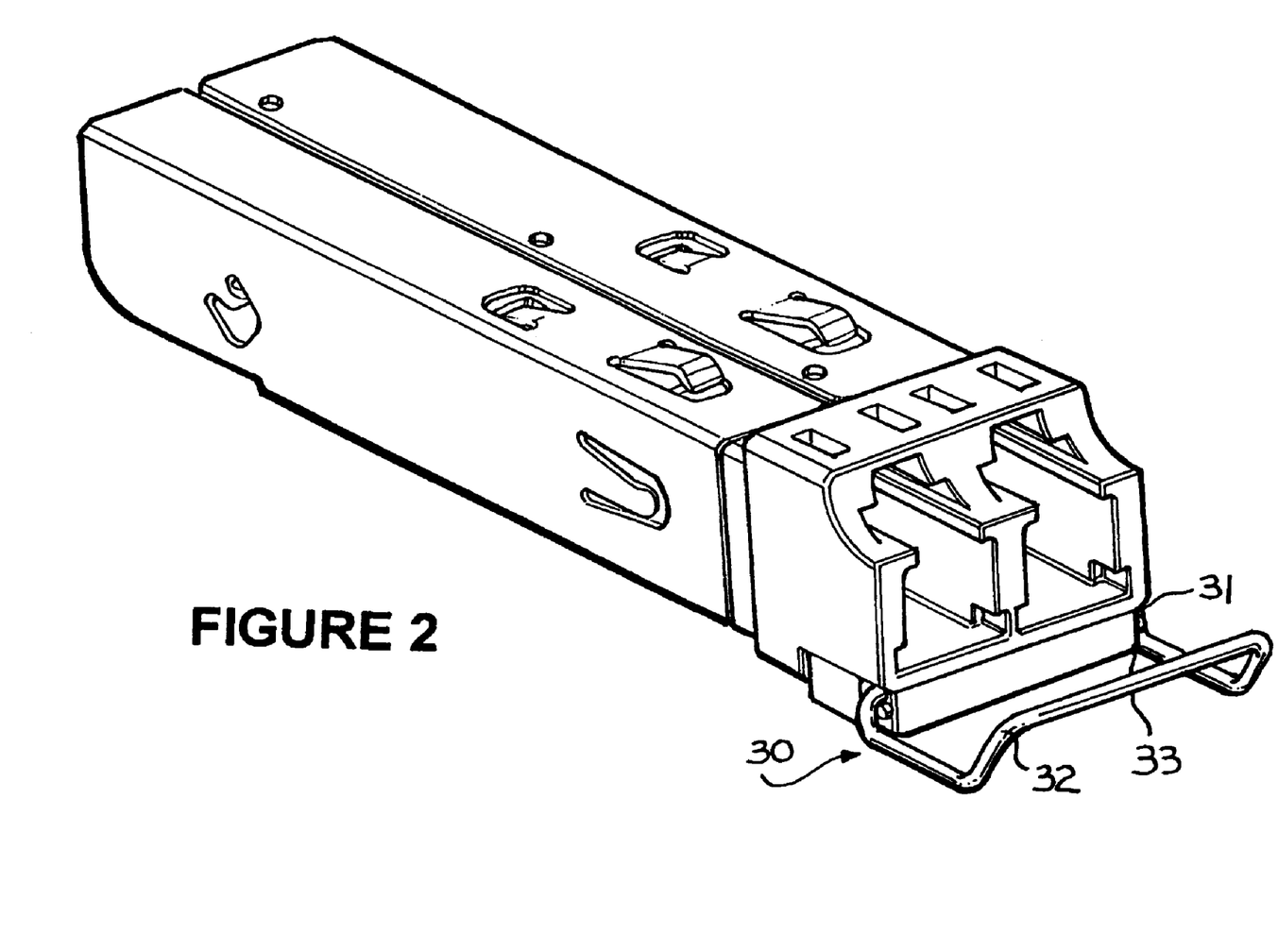
FIG. 2 is a front-top isometric view of the optoelectric package of FIG. 1, in an unlocked orientation.
Figure 3:
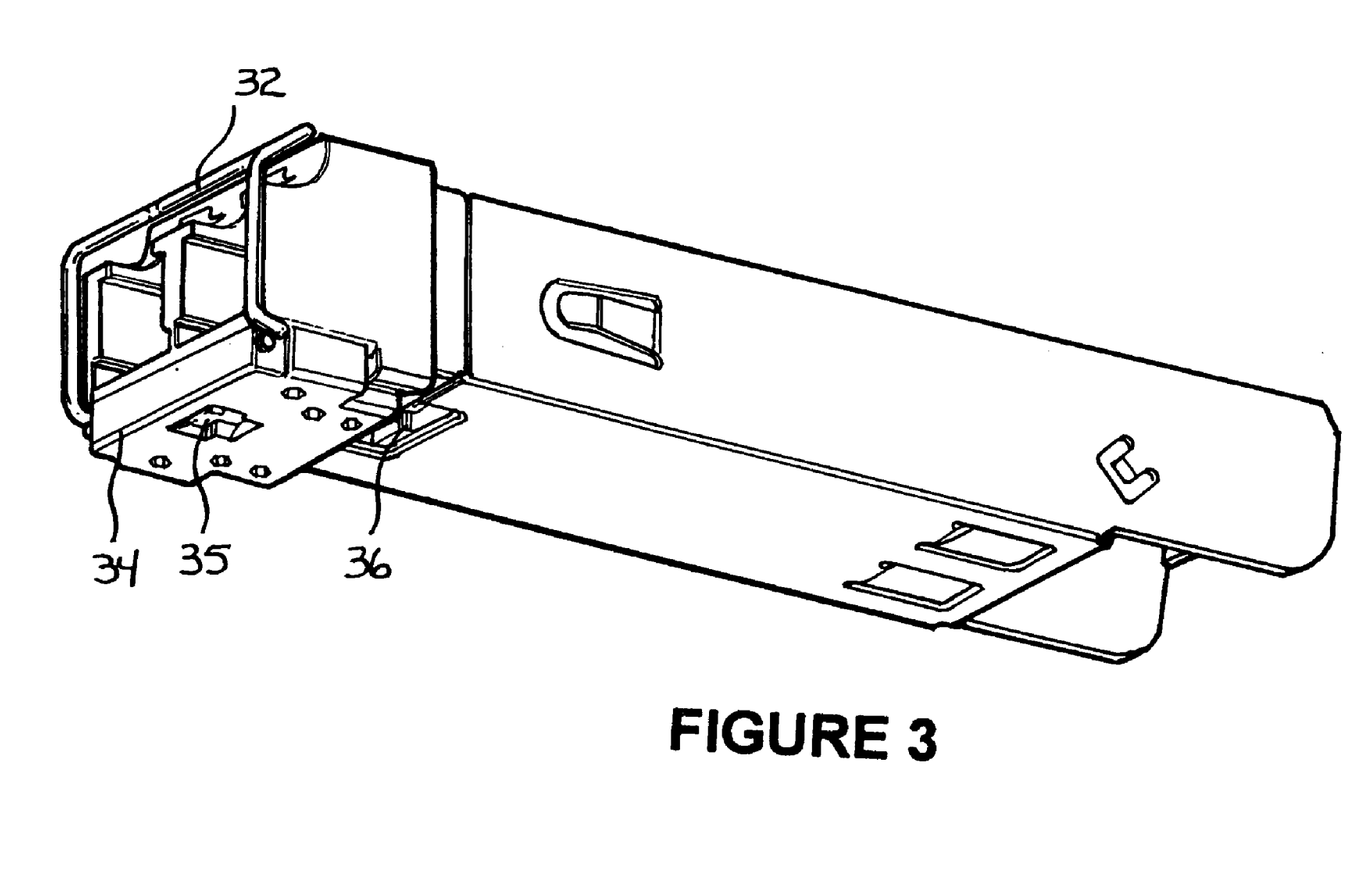
FIG. 3 is a front-bottom isometric view of the optoelectric package of FIG. 1, in a locked orientation.

In this preferred embodiment, a cam-based delatching actuator mechanism 30 is formed as a separate assembly and attached to header 24 during a final assembly. Thus, no modifications to current optoelectric packages are required. It will be understood, however, from the description below, that mechanism 30 can be initially formed as a portion of header 24. Mechanism 30 includes a lever arm 32, a mounting block 34, and an actuator 35 (see FIG. 3). In this embodiment, mounting block 34 is formed to be attached, by screws or the like, to the underside of header 24, as best seen in FIG. 3. Lever arm 32 is pivotally mounted in mounting block 34 for movement between a closed position, illustrated in FIG. 1, and an open position, illustrated in FIG. 2. In this preferred embodiment, lever arm 32 is formed from brass wire, which is sturdy and easy to form. Also detents 31 and 33 for lever arm 32 are formed in mounting block 34 to aid in holding lever arm 32 in the closed or vertical position and in the open or horizontal position.

Figure 4:
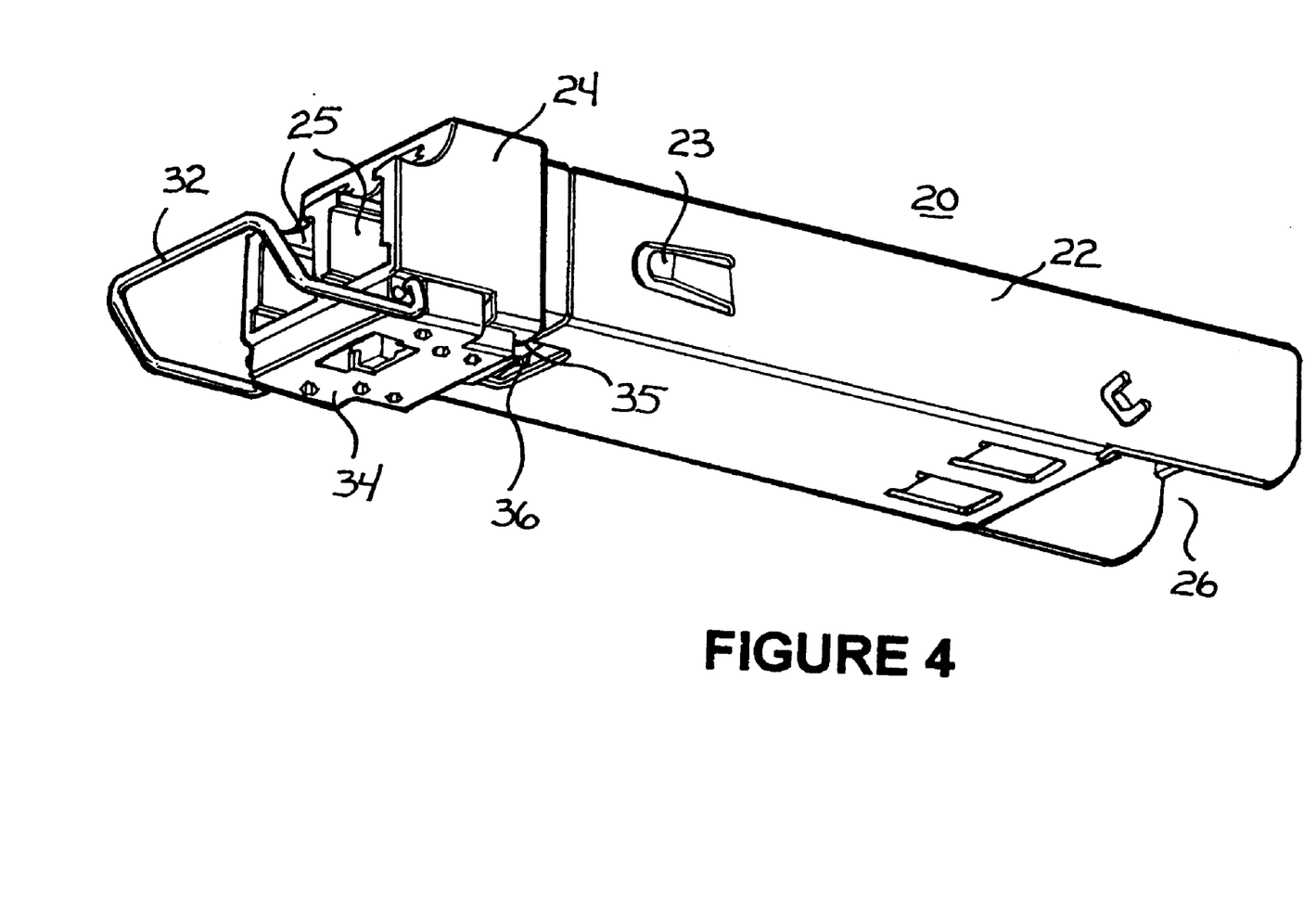
FIG. 4 is a front-bottom isometric view of the optoelectric package of FIG. 1, in an unlocked orientation.

As lever arm 32 moves from the closed position to the open position, an inner portion engages actuator 35 and cams actuator 35 rearwardly against a locking tab 36, as seen in FIG. 4. With actuator 35 positioned against locking tab 36, latch spring 16 of cage 10 is disengage and optoelectric package 20 can be easily withdrawn from the cage, using lever arm 32 as a handle.

Figure 5:
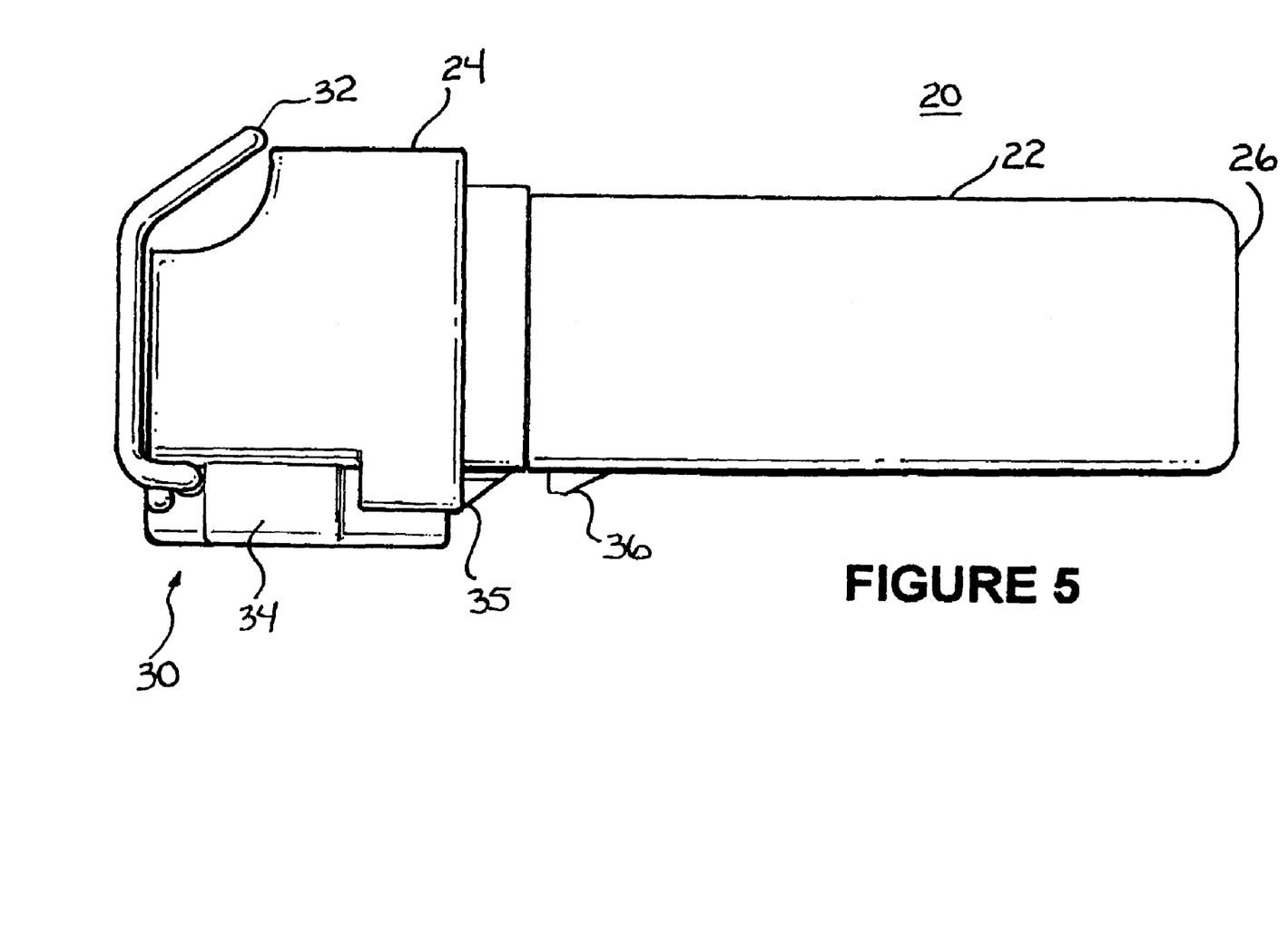
FIG. 5 is a side view illustrating the optoelectric package of FIG. 1, in a locked orientation.
Figure 6:
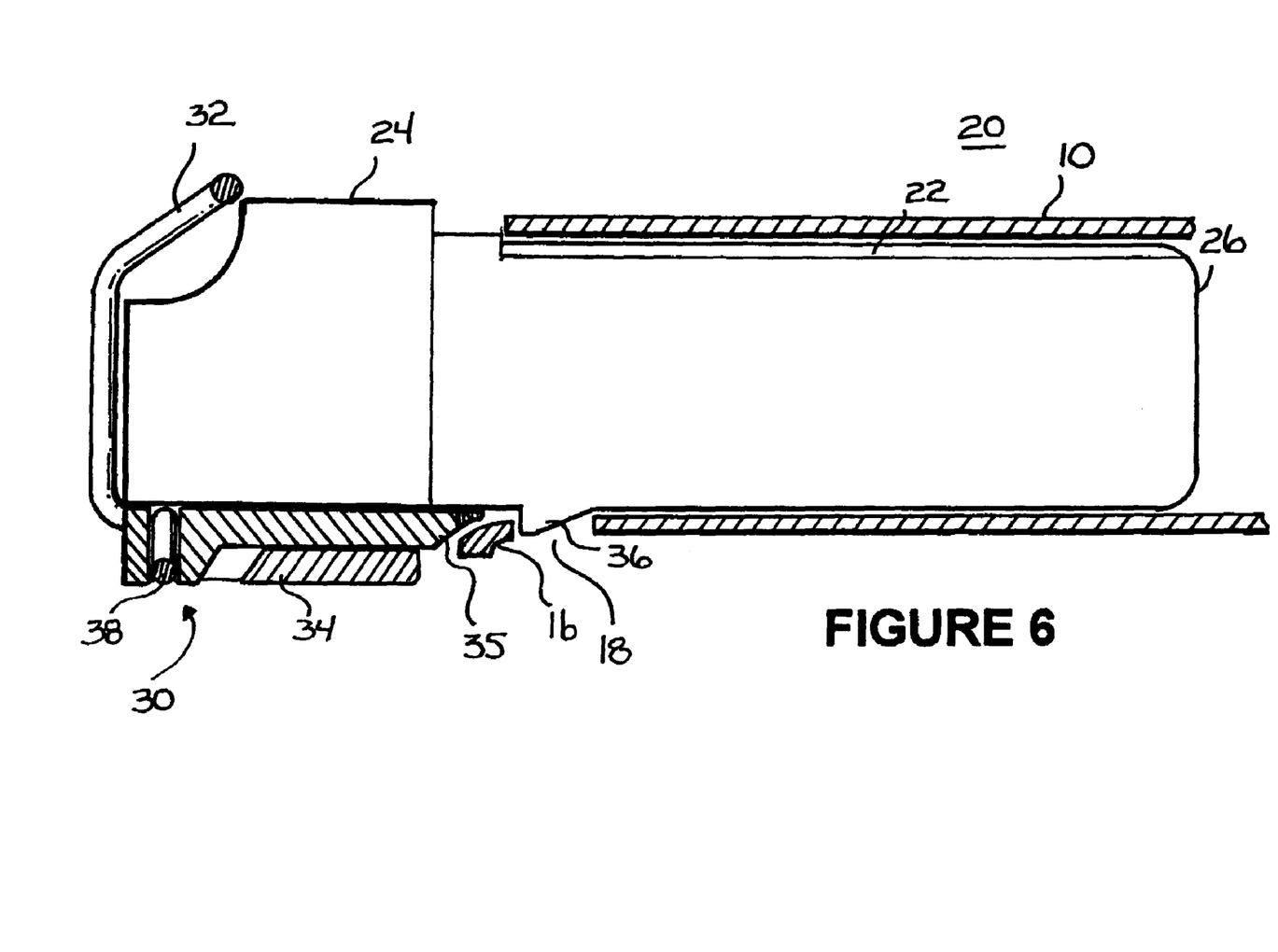
FIG. 6 is a partial cross-sectional view of the optoelectric package of FIG. 1, illustrating the cam-based delatching actuator in the locked orientation.

Referring additionally to FIGS. 5 and 6, optoelectric package 20 and cam-based delatching actuator mechanism 30 are illustrated in more detail. As can be seen from these views, with lever arm 32 in the up or closed orientation, actuator 35 is positioned in a spaced apart position from locking tab 36. As seen best in FIG. 6, lever 32 includes a formed camming feature 38 which is positioned in abutting engagement with actuator 35 in this closed position. Thus, latch spring 16 in cage 10 in which optical package 20 is nested, will engage locking tab 36 in triangularly shaped opening 18 and lock optical package 20 firmly in the nested position, as shown in FIG. 6.

Figure 7:
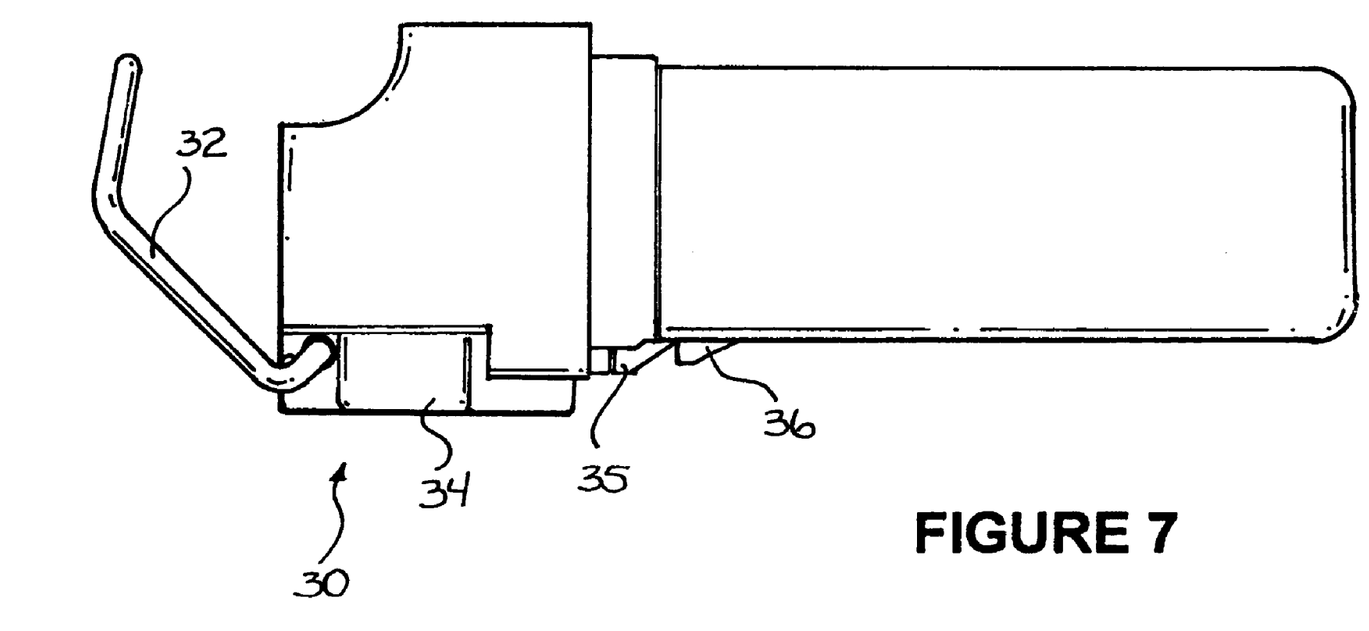
FIG. 7 is a side view illustrating the optoelectric package of FIG. 1, in a mid or partially unlocked orientation.
Figure 8:
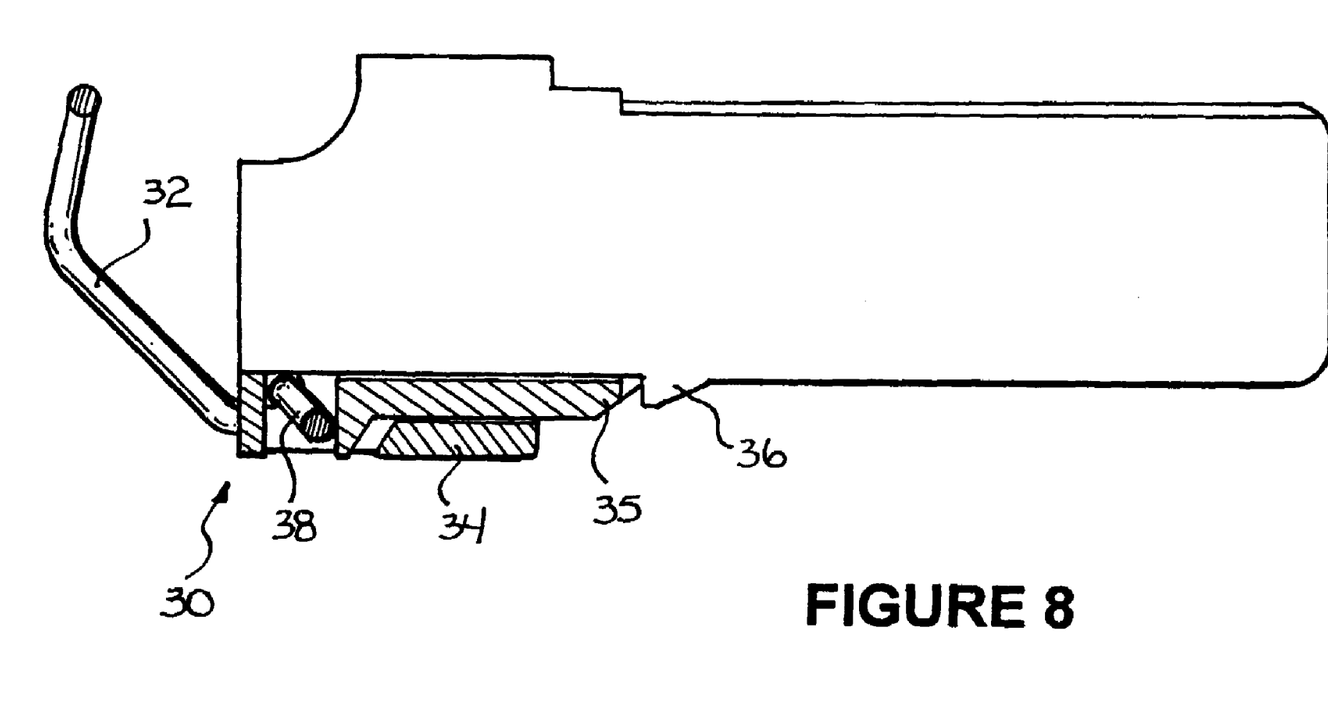
FIG. 8 is a partial cross-sectional view of the optoelectric package of FIG. 1, illustrating the cam-based delatching actuator in the mid or partially unlocked orientation.

Referring additionally to FIGS. 7 and 8, optoelectric package 20 and cam-based delatching actuator mechanism 30 are illustrated in a partially lowered or open orientation. From these views it can be seen that as lever arm 32 is rotated downwardly from the closed position to the open position, actuator 35 is cammed rearwardly by camming feature 38 of lever arm 32.

Figure 9:
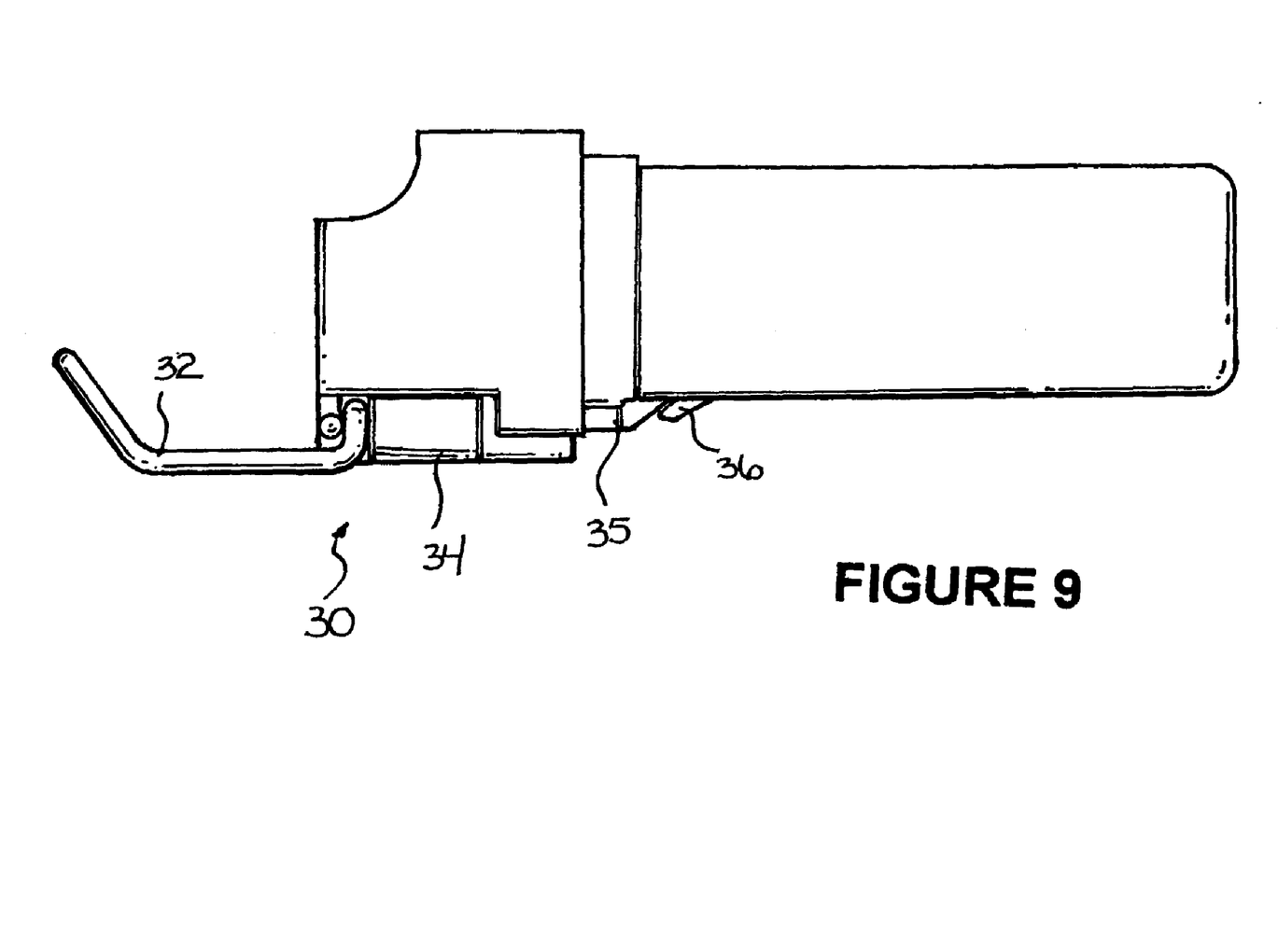
FIG. 9 is a side view illustrating the optoelectric package of FIG. 1, in an unlocked orientation.
Figure 10:
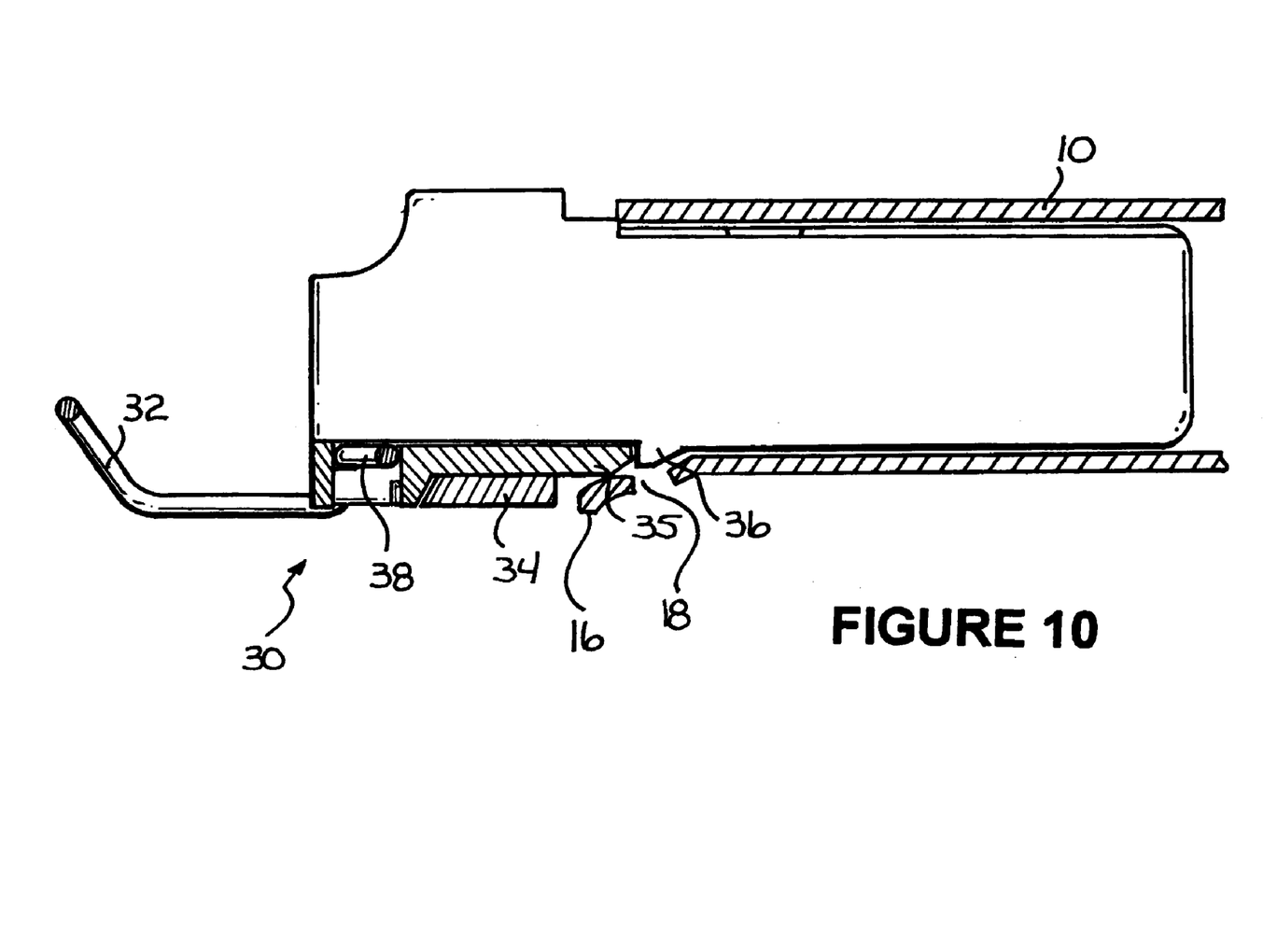
FIG. 10 is a partial cross-sectional view of the optoelectric package of FIG. 1, illustrating the cam-based delatching actuator in the unlocked orientation.

Referring additionally to FIGS. 9 and 10, optoelectric package 20 and cam-based delatching actuator mechanism 30 are illustrated in a lowered or open orientation. From these views it can be seen that when lever arm 32 is rotated completely into the open position, actuator 35 is cammed rearwardly by camming feature 38 of lever arm 32 against locking tab 36. With actuator 35 positioned against locking tab 36, latch spring 16 of cage 10 is disengage, as illustrated in FIG. 10, and optoelectric package 20 can be easily withdrawn from cage 10, using lever arm 32, which is now in an unobstructed position an can be easily gripped, as a handle. Thus, the packing density of optoelectric packages 20 in a rack of cages 10 is not an issue.

While cam-based delatching actuator mechanism 30 is illustrated in conjunction with a specific optoelectric package 20, it will be understood that it may be used with other optoelectric packages and may be incorporated as an integral portion or added during assembly. Also, while a specific lever arm 32 is illustrated and described, it will be understood that other embodiments may be devised which essentially perform the same functions.

Thus, cam-based delatching actuator mechanism 30 improves the delatching feature because lever arm 32 is in an unobstructed position and accessibility is greatly increased. Also, lever arm 32 is formed of sturdy and reliable material which greatly increases the life and reliability of the assembly. Further, the pivot point and camming features of lever arm 32 are designed into mounting block 34 so as to be fixed, which enables the addition of stabilizing detents 31 and 33 for lever arm 32 in the vertical and horizontal positions. Lever arm 32 not only allows the unlatching of optoelectric package 20 but provides a convenient sturdy grip for the removal of optoelectric package 20 from the cage so that packing density is no longer a problem.

Figure 11:
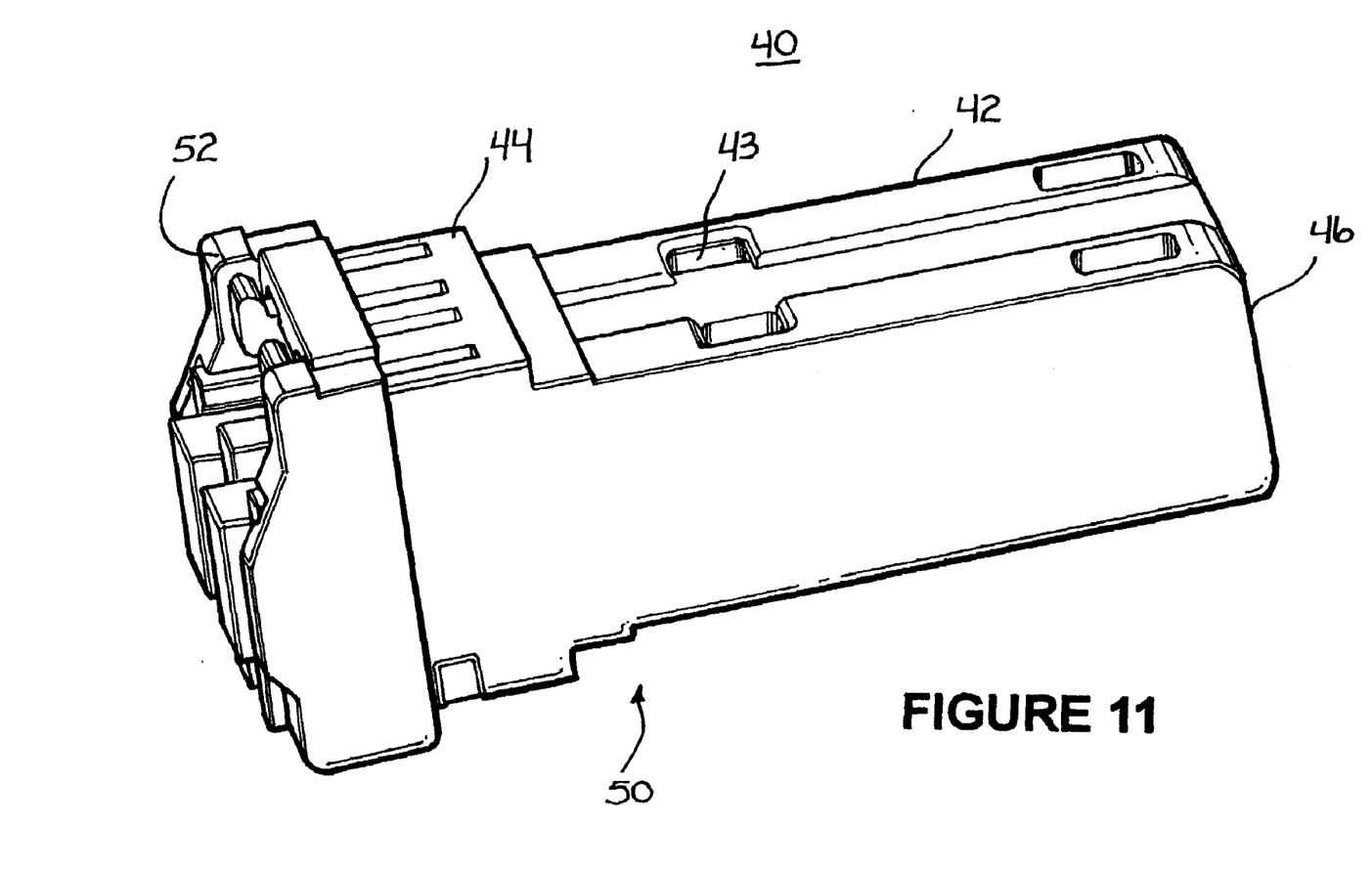
FIG. 11 is a front-top isometric view of another embodiment of an optoelectric package, in a locked orientation, in accordance with the present invention.

Turning now to FIG. 11, another embodiment of an optoelectric package 40 in accordance with the present invention is illustrated. Optoelectric package 40 includes an elongated housing 42, which in this embodiment is formed of metal and includes spring fingers 43 positioned to frictionally engage an inner surface of a cage in a mounting rack (not shown). Spring fingers 43 ensure a positive contact between optoelectric package 40 and the cage to prevent relative movement, once the optoelectric package is properly nested in the cage and to electrically connect optoelectric package 40 to the cage.

Housing 42 includes a header 44, which in this embodiment is formed of a single piece and may be manufactured by some convenient means, such as molding or the like. Header 44 is mated with the elongated portions of housing 42 and includes a pair of openings 45 (best seen in FIG. 13) designed to receive an optical-to-electrical module (not shown) in one side and an electrical-to-optical module (not shown) in the other side. Each of the modules may electrically connect to the multipin electrical connector at the rear end 46 of housing 42 when they are properly inserted into the openings 45 or, as in this embodiment, the combined modules may actually form the multipin connector.

In this preferred embodiment, a cam-based delatching actuator mechanism 50 is attached to header 44. It will be understood, from the description below, that mechanism 50 can be initially formed as a portion of header 44 or can be formed separately and attached during assembly. Mechanism 50 includes a lever 52 (which acts as a door to close openings 45), a mounting structure 54, and an actuator 55. Lever 52 is pivotally attached to header 44 for movement between a closed position, illustrated in FIG. 11, and an open position, illustrated in FIG. 13. In this preferred embodiment, lever 52 is molded or otherwise formed from plastic, metal, or any other convenient material, which is sturdy and easy to form.

Figure 12:
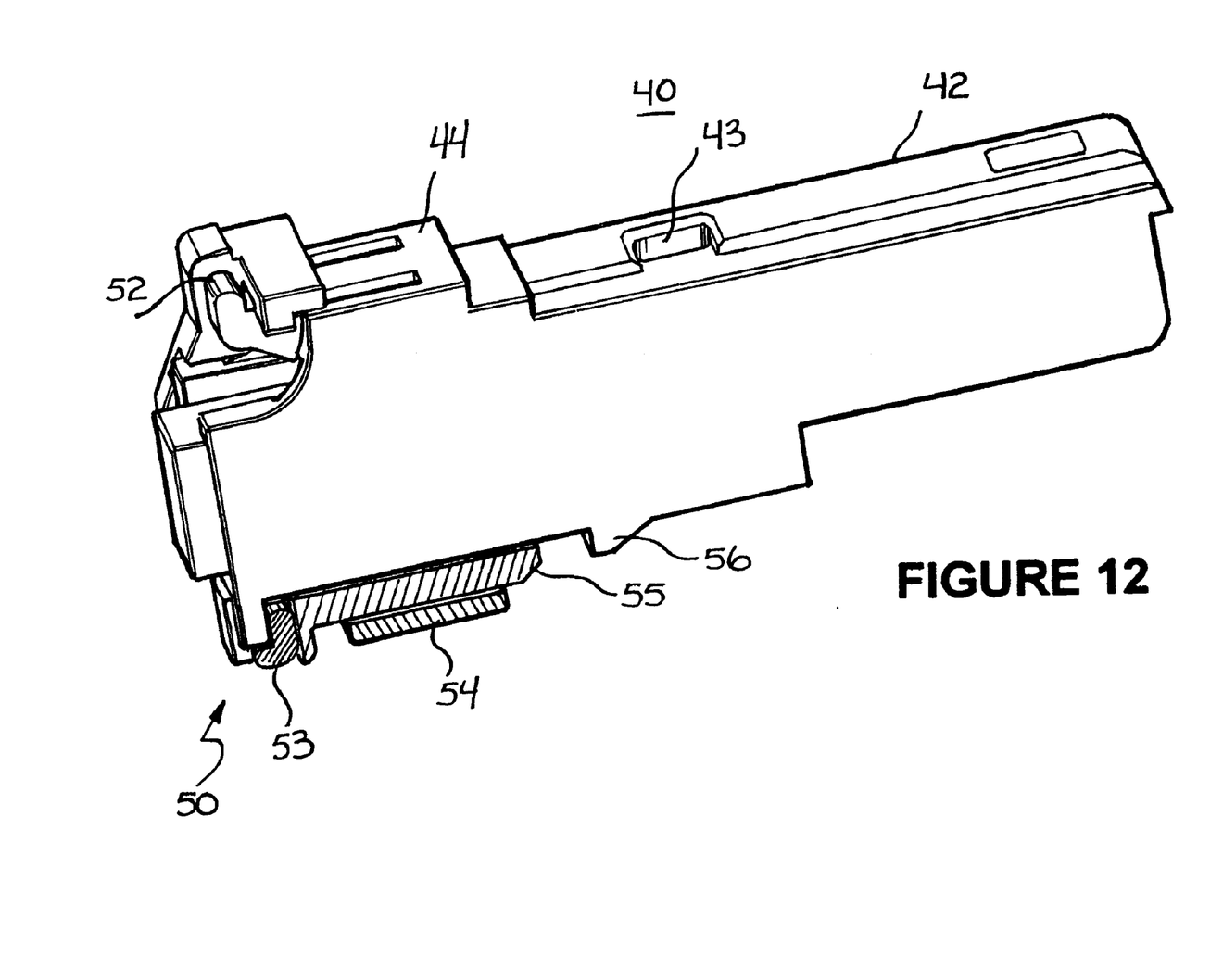
FIG. 12 is a partial cross-sectional view, similar to FIG. 11, of the optoelectric package of FIG. 11, illustrating the cam-based delatching actuator in the locked orientation.

A cam 53 is attached to lever 52 so as to rotate with lever 52. As can be seen in FIG. 12, cam 53 is positioned in abutting engagement with actuator 55. Further, actuator 55 is slidably engaged in mounting structure 54 for forward (locked) and rearward (unlocked) movements. With lever 52 in the closed position, illustrated in FIGS. 11 and 12, cam 53 is positioned so that actuator 55 is oriented rearwardly or in the locked position. In this position a latch spring in the cage (not shown) in which optical package 40 is nested, will engage locking tab 56 and lock optical package 40 firmly in the nested position.

Figure 13:
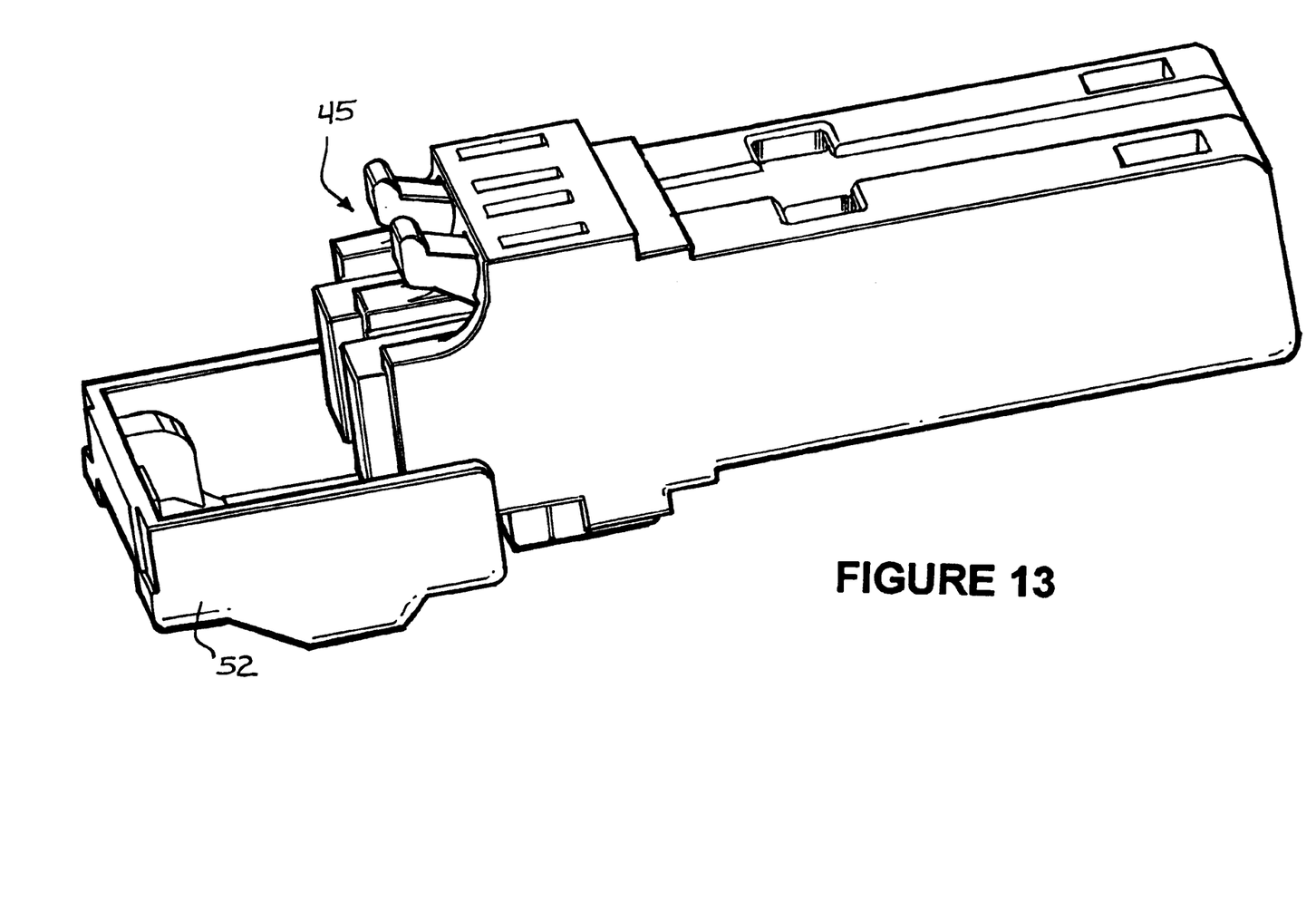
FIG. 13 is a front-top isometric view illustrating the optoelectric package of FIG. 11, in an unlocked orientation.
Figure 14:
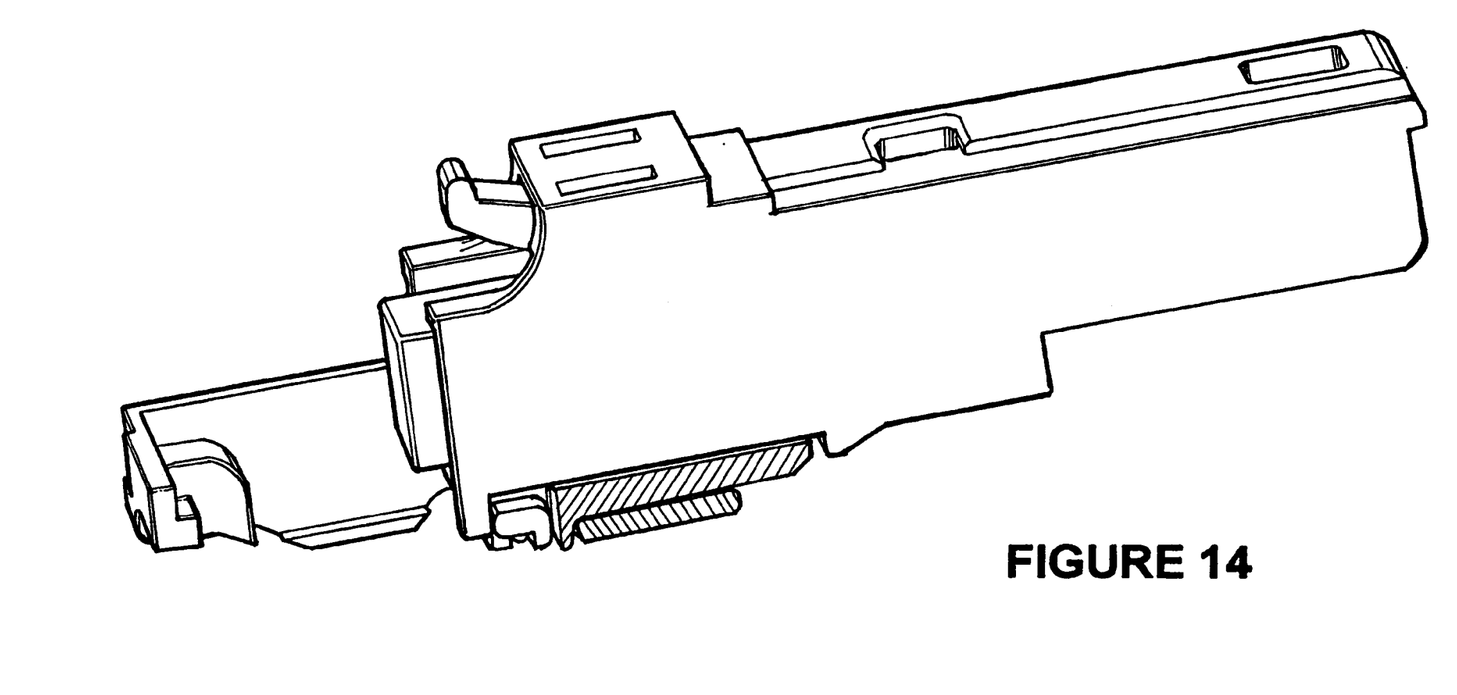
FIG. 14 is a partial cross-sectional view, similar to FIG. 12, of the optoelectric package of FIG. 11, illustrating the cam-based delatching actuator in the unlocked orientation.

As lever 52 moves from the closed position to the open position, cam 53 moves actuator 55 rearwardly against locking tab 56, as illustrated in FIGS. 13 and 14. With actuator 55 positioned against locking tab 56, the latch spring of the cage (not shown) is disengage and optoelectric package 40 can be easily withdrawn from the cage, using lever 52 as a handle.

Thus, an optoelectric package with a cam-based delatching actuator mechanism with and improved delatching feature has been disclosed. The lever arm of the cam-based delatching actuator mechanism is in an unobstructed position and, consequently, the accessibility is greatly increased. Also, the lever arm is formed of sturdy and reliable material which greatly increases the life and reliability of the assembly. Further, the pivot point and camming features of the lever arm are designed into a mounting block so as to be fixed, which enables the addition of stabilizing detents for the lever arm in the vertical and horizontal positions. The lever arm not only allows the unlatching of an optoelectric package but provides a convenient sturdy grip for the removal of the optoelectric package from the cage so that the packing density is no longer a substantial problem.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An optoelectric package comprising:
    an elongated housing for fixedly holding an optoelectric module; and
    a cam-based delatching actuator mechanism fixedly attached to the elongated housing, the cam-based delatching actuator mechanism including
        a mounting block fixedly attached to one of a first and a second horizontal side of the elongated housing,
        a lever arm fixedly attached to a first and a second vertical side of the elongated housing, and
        an actuator positioned adjacent to one of the first and second horizontal side of the elongated housing wherein the actuator is in mechanical communication with the lever arm, the lever arm engaging an inner portion of the actuator to cam the actuator rearwardly against a locking tab when the lever arm moves from the closed position to the open position.

2. An optoelectric package as claimed in claim 1 wherein the elongated housing can be disengaged from a cage when the actuator is cammed rearwardly against the locking tab.

3. An optoelectric package comprising:
    an elongated housing;
    a header mated with the elongated portions of the housing wherein the header includes a pair of openings designed to receive at least one optoelectronic module;
    a cam-based delatching actuator mechanism fixedly attached to the header, wherein the cam-based delatching actuator mechanism includes
        a mounting block fixedly attached to one of a first and a second horizontal side of the header;
        a lever arm fixedly attached to a first and a second vertical side of the header, the lever arm being pivotally mounted to the mounting block for movement between a closed position and an open position; and
        an actuator positioned adjacent to one of the first and second horizontal sides of the header wherein the actuator is in mechanical communication with the lever arm, the lever arm including a formed camming feature which is positioned in abutting engagement with the actuator when the lever arm is in the closed position and wherein the lever arm engages an inner portion of the actuator to cam the actuator rearwardly against a locking tab when the lever arm moves from the closed position to the open position.

4. An optoelectric package as claimed in claim 3 wherein the elongated housing can be disengaged from a cage when the actuator is cammed rearwardly against the locking tab.

5. A method of engaging or disengaging an optoelectric package from a cage, the method comprising steps of:
    providing an elongated housing for fixedly holding an optoelectric module;
    fixedly attaching a cam-based delatching actuator mechanism to the header, wherein the cam-based delatching actuator mechanism includes
        a mounting block fixedly attached to one of a first and a second horizontal side of the header;
        a lever arm fixedly attached to a first and a second vertical side of the header;
        an actuator positioned adjacent to one of the first and second horizontal sides of the header wherein the actuator is in mechanical communication with the lever arm; and
    positioning the lever arm in engagement with an inner portion of the actuator to cam the actuator rearwardly against a locking tab when the lever arm moves from the closed position to the open position.

6. A method as claimed in claim 5 wherein the step of fixedly attaching the cam-based delatching actuator mechanism includes positioning the lever arm in engagement with an inner portion of the actuator to cam the actuator rearwardly against a locking tab when the lever arm moves from the closed position to the open position.

* * * * *